United States Patent
Cho

(10) Patent No.: US 9,882,388 B2
(45) Date of Patent: Jan. 30, 2018

(54) PHOTOVOLTAIC DEVICE

(71) Applicant: LSIS CO., LTD., Anyang-si, Gyeonggi-do (KR)

(72) Inventor: Choong Kun Cho, Gunpo-si (KR)

(73) Assignee: LSIS CO., LTD., Anyang-si, Gyeonggi-Do (KR)

(*) Notice: Subject to any disclaimer, the term of this patent is extended or adjusted under 35 U.S.C. 154(b) by 221 days.

(21) Appl. No.: 14/930,517

(22) Filed: Nov. 2, 2015

(65) Prior Publication Data
US 2016/0211671 A1  Jul. 21, 2016

(30) Foreign Application Priority Data
Jan. 19, 2015 (KR) .................. 10-2015-0008919

(51) Int. Cl.
*H02J 3/38* (2006.01)
*H02S 50/00* (2014.01)

(52) U.S. Cl.
CPC ............. *H02J 3/383* (2013.01); *H02S 50/00* (2013.01); *Y02E 10/563* (2013.01); *Y02E 60/74* (2013.01); *Y04S 10/30* (2013.01)

(58) Field of Classification Search
None
See application file for complete search history.

(56) References Cited

U.S. PATENT DOCUMENTS

| 2005/0051209 A1* | 3/2005 | Choe | H01L 31/00 136/252 |
|---|---|---|---|
| 2008/0147335 A1 | 6/2008 | Adest et al. | |
| 2011/0282600 A1 | 11/2011 | Roesner et al. | |
| 2012/0004780 A1* | 1/2012 | Miller | F24J 2/38 700/286 |
| 2012/0242320 A1 | 9/2012 | Fischer et al. | |
| 2012/0310427 A1* | 12/2012 | Williams | G05F 1/67 700/287 |
| 2014/0054962 A1* | 2/2014 | Shuy | H02J 1/00 307/23 |

(Continued)

FOREIGN PATENT DOCUMENTS

| CN | 101640434 | 2/2010 |
|---|---|---|
| CN | 202260633 | 5/2012 |

(Continued)

OTHER PUBLICATIONS

State Intellectual Property Office of the People's Republic of China Application Serial No. 201610009425.8, Office Action dated May 2, 2017, 7 pages.

(Continued)

*Primary Examiner* — Carlos Amaya
*Assistant Examiner* — Aqueel Bukhari
(74) *Attorney, Agent, or Firm* — K&L Gates, LLP

(57) ABSTRACT

A photovoltaic device is provided. The photovoltaic device includes a photovoltaic cell array absorbing solar voltaic energy to convert the solar voltaic energy to electrical energy, and a sensing unit sensing at least any one of power generation information for representing a state of the photovoltaic device and environmental information for representing environmental information around the photovoltaic device, and measuring a time when the at least one of the power generation information and the environmental information is sensed.

8 Claims, 8 Drawing Sheets

(56) References Cited

U.S. PATENT DOCUMENTS

2016/0181971 A1* 6/2016 Cherukupalli .... H01L 31/02021
136/244

FOREIGN PATENT DOCUMENTS

| | | |
|---|---|---|
| EP | 2600406 | 6/2013 |
| JP | 2011181853 | 9/2011 |
| JP | 2012150725 | 8/2012 |
| JP | 2013038345 | 2/2013 |
| JP | 2014510282 | 4/2014 |
| KR | 20140127930 | 11/2014 |

OTHER PUBLICATIONS

European Patent Office Application Serial No. 15194414.7, Search Report dated May 25, 2016, 7 pages.
Japan Patent Office Application Serial No. 2015-224602, Office Action dated Nov. 1, 2016, 2 pages.
Japan Patent Office Application No. 2015-224602, Office Action dated Jun. 8, 2017, 3 pages.

* cited by examiner

| SENSOR ADDRESS | SENSOR TYPE | MEASUREMENT VALUE | TIME STAMP | | | | | | | CRC |
|---|---|---|---|---|---|---|---|---|---|---|
| 0x01 SENSOR NO.1 | 0x01 VOLTAGE SENSOR | 0x64 100V | 0x04 | 0x0C | 0x06 | 0x14 | 0x0D | 0x18 | 0x11 | 0xDC 0x26 |
| | | | 2014 YEAR | JUNE | DATE 20 | 1 PM | 30 MIN. | 21 SEC. | | |

PHOTOVOLTAIC DEVICE

CROSS-REFERENCE TO RELATED APPLICATIONS

Pursuant to 35 U.S.C. §119(a), this application claims the benefit of earlier filing date and right of priority to Korean Patent Application No. 10-2015-0008919, filed on Jan. 19, 2015, the contents of which are all hereby incorporated by reference herein in its entirety.

BACKGROUND

The present disclosure relates to a photovoltaic device.

Interest in alternative energy is picking up because of depletion of fossil energy such as petroleum and concern about environmental pollution. Among them, photovoltaic power generation is being spotlighted which generates electricity on a mass scale by deploying a panel in a large scale with a photovoltaic cell attached thereon to use solar voltaic energy. Since the photovoltaic power generation uses solar voltaic energy that is unlimited and pollution-free, there is no occurrence of air pollution or wastes.

There are two photovoltaic power generation types of an off-grid type and on-grid type. In the off-grid type, a photovoltaic device is connected to a stand-alone load that is not connected to a grid. In the on-grid type, a photovoltaic device is connected to an existing grid. The photovoltaic device transmits electricity, which is generated in the daytime, to the grid and receives electricity from the grid at night or in case of rain. In order to efficiently use the on-grid type photovoltaic system, a photovoltaic system is introduced for storing idle power in a Battery Energy Storage System (BESS) in case of a light load, and for supplying power discharged from the BESS in addition to power from the photovoltaic device to the grid in case of overload.

Power generation output of this photovoltaic device is influenced by environmental factors such as weather or time. Accordingly, it is necessary to continuously detect these environmental elements. In addition, the photovoltaic device requires a relatively wide area for absorbing a large amount of solar light. Accordingly, there are many cases where the photovoltaic device is located remotely from a general residence area or a working area of a manager who manages the photovoltaic device. Due to this reason, the photovoltaic device includes a data logger for collecting a state of the photovoltaic device and transmit it to the outside thereof.

SUMMARY

Embodiments provide a photovoltaic device for efficiently and accurately recording and transmitting a state of the photovoltaic device.

Embodiments also provide a photovoltaic device for recording and transmitting together a state of the photovoltaic device and a time when the state of the photovoltaic device is detected. At this point, a plurality of sensing units may record the state of the photovoltaic device at the same time.

In one embodiment, a photovoltaic device includes: a photovoltaic cell array absorbing solar voltaic energy to convert the solar voltaic energy to electrical energy; and a sensing unit sensing at least any one of power generation information for representing a state of the photovoltaic device and environmental information for representing environmental information around the photovoltaic device, and measuring a time when the at least one of the power generation information and the environmental information is sensed.

The sensing unit may include a plurality of sensors, wherein the plurality of sensors sense the at least any one of the power generation information and the environmental information at an identical time.

The sensing unit may transmit state information including the at least any one of the power generation information and the environmental information, and the time when the at least any one of the power generation information and the environmental information is sensed.

The sensing unit may include a plurality of sensors, wherein the plurality of sensors sequentially transmit the state information.

The state information may include at least any one of identification information for identifying a sensor included in the sensing unit, measurement information for representing a value sensed by the sensor, time information for representing a time when the sensor senses, and error detecting information for detecting an information error.

The identification information may include at least any one of sensor address information for representing a connection position of the sensor, and sensor type information for representing a type of the sensor.

The power generation information may include at least any one of a voltage of power generated by the photovoltaic device and a temperature in the photovoltaic device, and the state information may include at least any one of a solar insolation and temperature of a place where the photovoltaic device is located.

In another embodiment, an operation method of a photovoltaic device, includes: absorbing solar voltaic energy to convert the solar voltaic energy to electrical energy; sensing at least any one of power generation information for representing a state of the photovoltaic device and environmental information for representing environmental information around the photovoltaic device; and measuring a time when the at least one of the power generation information and the environmental information is sensed.

The details of one or more embodiments are set forth in the accompanying drawings and the description below. Other features will be apparent from the description and drawings, and from the claims.

DETAILED DESCRIPTION OF THE EMBODIMENTS

Figure 1:
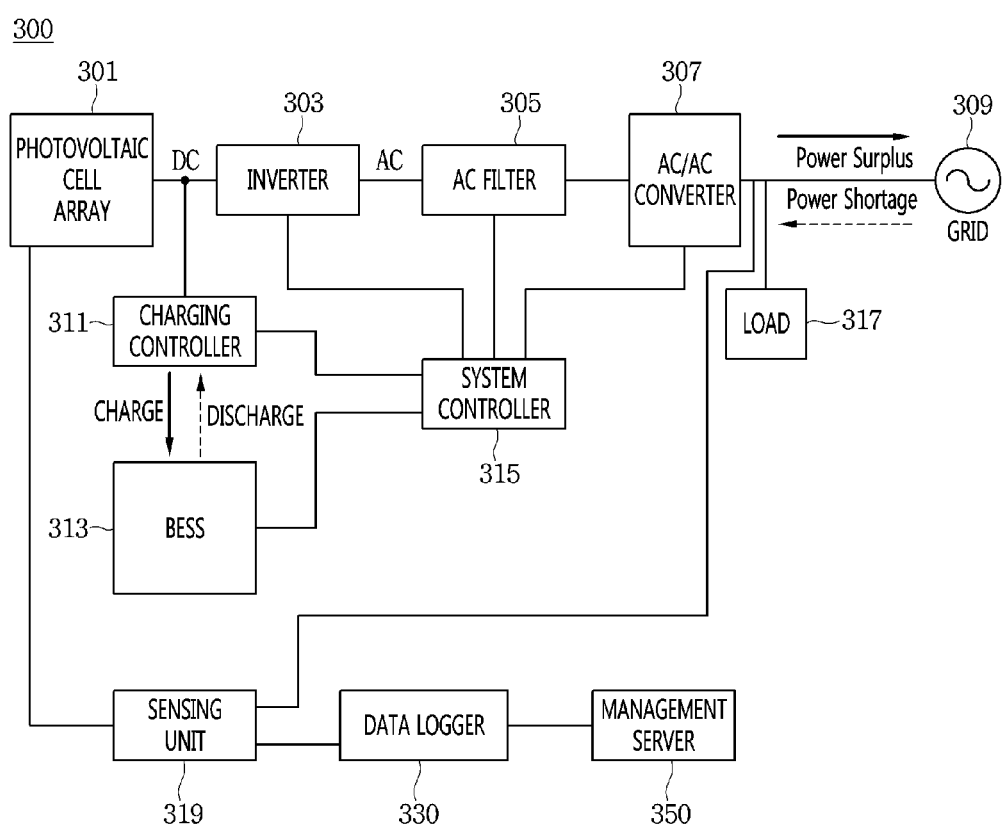
FIG. 1 is a block diagram of a photovoltaic device according to an embodiment.

Reference will now be made in detail to the embodiments of the present disclosure, examples of which are illustrated in the accompanying drawings.

A photovoltaic device according to an embodiment will be described in detail with reference to the accompanying drawings. The invention may, however, be embodied in many different forms and should not be construed as being limited to the embodiments set forth herein; rather, that alternate embodiments included in other retrogressive inventions or falling within the spirit and scope of the present disclosure can easily be derived through adding, altering, and changing, and will fully convey the concept of the invention to those skilled in the art.

Hereinafter, embodiments of the present invention will be described in detail with reference to the accompanying drawings so that the present invention can be easily realized by those skilled in the art. The present invention can be practiced in various ways and is not limited to the embodiments described herein. In the drawings, parts which are not related to the description are omitted to clearly set forth the present invention and similar elements are denoted by similar reference symbols throughout the specification.

In addition, when an element is referred to as "comprising" or "including" a component, it does not preclude another component but may further include the other component unless the context clearly indicates otherwise.

FIG. 1 is a block diagram of a photovoltaic device according to an embodiment.

A photovoltaic device 300 according to an embodiment includes a photovoltaic array 301, an inverter 303, an AC filter 305, an AC/AC converter 307, a grid 309, a charging controller 311, a Battery Energy Storage System (BESS) 313, a system controller 315, a load 317, a sensing unit 319, and a data logger 330.

Accordingly, the photovoltaic cell array 301 absorbs the solar voltaic energy to convert it to the electrical energy.

The inverter 303 inverts DC power to AC power. The inverter 303 receives, through the charging controller 311, the DC power supplied by the photovoltaic cell array 301 or the DC power discharged from the BESS 113 to invert it to the AC power.

The AC filter 305 filters noise from the inverted AC power.

The AC/AC converter 307 performs conversion on the magnitude of the AC power that the noise is filtered and supplies the magnitude-converted AC power to the grid 309 and load 317.

The grid 309 is a system in which a power plant, a substation, a transmission/distribution line, and a load are integrated to generate and use power.

The charging controller 311 controls charge of and discharge from the BESS 313.

The BESS 313 receives electrical energy from the photovoltaic cell array 301 to be charged therewith and discharges the electrical energy according to a power supply-demand situation of the grid 309 or load 317.

The system controller 315 controls operations of the charging controller 311, inverter 303, AC filter 305, and AC/AC converter 307.

The load 317 receives to consume the electrical energy.

The sensing unit 319 senses at least any one of a state of the photovoltaic device 300 and a surrounding environment state around the photovoltaic device 300. In detail, the sensing unit 319 may detect the state of the photovoltaic device 300. At this point, the state of the photovoltaic device 300 may include at least any one of a voltage of power generated by the photovoltaic device 300 and a temperature in the photovoltaic device 300. In addition, the sensing unit 319 may detect the state of surrounding environment around the photovoltaic device 300. At this point, the state of the photovoltaic device 300 may include at least any one of a solar insolation and temperature of a place where the photovoltaic device 300 is located. Accordingly, the sensing unit 319 may include a plurality of sensors. In detail, the sensing unit 319 may include at least any one of a solar insolation sensor, temperature sensor, and voltage sensor.

The data logger 330 receives the state information from the sensing unit 319 to transmit it to an external management server 350.

The manager of the photovoltaic device 300 may check whether the photovoltaic device 300 is abnormal and a power generation state through the state information that is transmitted to the managing server 350. In detail, the manager of the photovoltaic device 300 may check whether a failure occurs in the photovoltaic device 300 when the power generation is smaller compared to the solar insolation. Accordingly, the manager of the photovoltaic device 300 may inspect the photovoltaic device 300. In another detailed embodiment, when quality of power generated by the photovoltaic device 300 is not good, the manager of the photovoltaic device 300 may estimate a replacement period of an element that is necessary to the photovoltaic device 300. In another detailed embodiment, when a temperature of the photovoltaic device 300 is excessively high or a surrounding temperature of the photovoltaic device is excessively high, the manager may stop operation of the photovoltaic device 300 for a certain period. In another detailed embodiment, when an owner of the photovoltaic device 300 earns an income for supplying power to the grid 309, the information transmitted by the data logger 330 may be a basis material for the income. In detail, when a less income is calculated than that of other days due to a small amount of supplying power, the owner of the photovoltaic device 300 may check a cause of the small amount of power generation by using information on a small solar insolation transmitted from the data logger 330. Like this, the sensing unit 319 and data logger 330 allow the photovoltaic device 300 to be efficiently managed and maintained.

Figure 2:
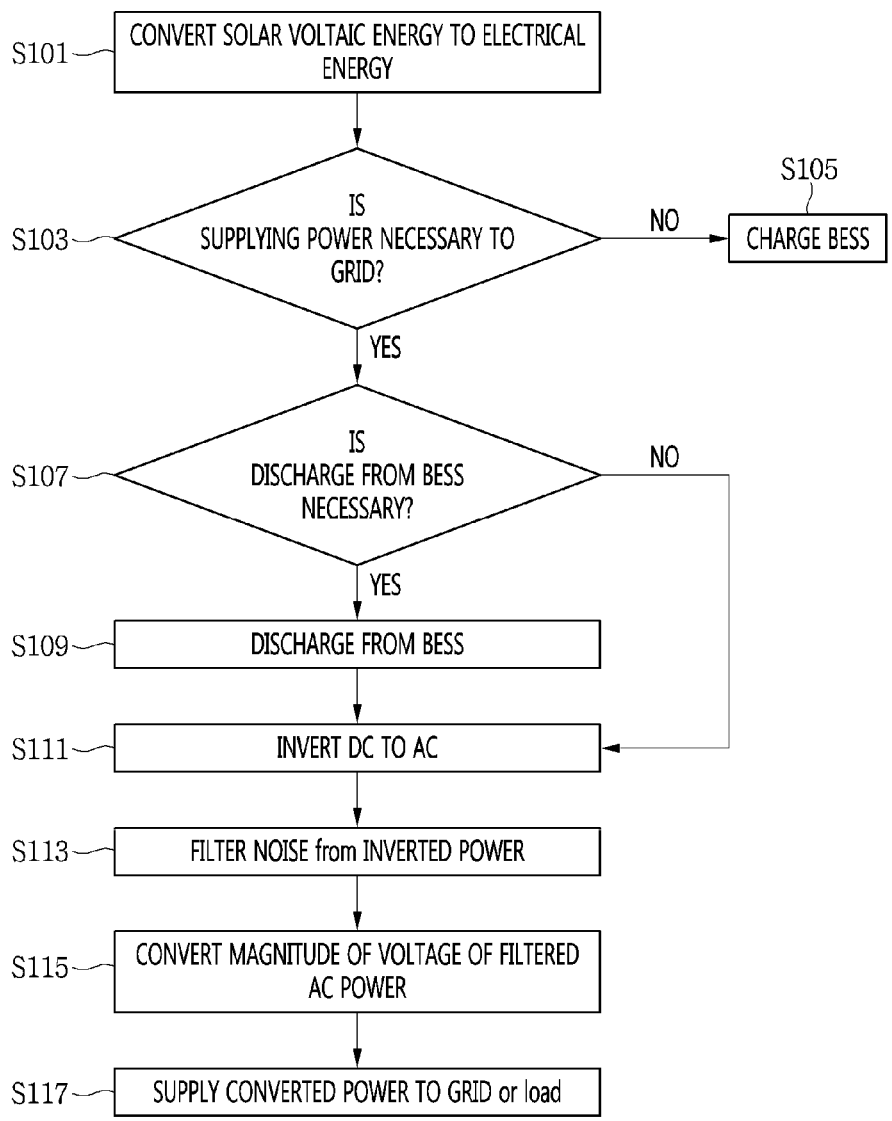
FIG. 2 is an operation flowchart of a photovoltaic device according to an embodiment.

FIG. 2 is an operation flowchart of a photovoltaic device according to an embodiment.

The photovoltaic cell array 301 converts the solar voltaic energy to the electrical energy (operation S101).

The system controller 315 determines whether it is necessary to supply power to the grid 309 (operation S103). Whether it is necessary to supply power to the grid 309 may be determined on the basis of whether the grid 309 is overloaded or light-loaded.

When it is not necessary to supply power to the grid 309, the system controller 315 controls the charging controller 311 to charge the BESS 313 (operation S105). In detail, the system controller 315 may generate a control signal for controlling the charging controller 311. The charging controller 311 may receive the control signal and charge the BESS 313.

The system controller 315 determines whether it is necessary to discharge the BESS 313 (operation S107). The system controller 115 may determine whether it is necessary to discharge the BESS, since power demand of the grid 309 is not satisfied only with electrical energy supplied by the photovoltaic cell array 301. In addition, the system controller 315 may determine whether the BESS 313 stores enough energy to discharge.

When it is necessary to discharge the BESS 313, the system controller 315 controls the charging controller 311 to discharge the BESS 313. In detail, the system controller 315 may generate a control signal for controlling the charging controller 311. The charging controller 311 may receive the control signal and discharge the BESS 313.

The inverter 303 inverts, to AC power, the electrical energy discharged from the BESS 313 and the electrical energy converted by the photovoltaic cell array 301 (operation S111). At this point, the on-grid photovoltaic device 300 inverts, with one inverter 303, the electrical energy discharged from the BESS 313 and the electrical energy converted by the photovoltaic cell array 301. Each electrical device has an available power limit. This limit is divided into an instant limit and a long time use limit, and regulatory power is determined as maximum power that does not damage a device and is available for a long time. In order to maximize efficiency of the inverter 303, the BESS 313 and the photovoltaic cell array 301 are required to supply power so that the inverter 303 uses power of about 40% to about 60% of such a regulatory power.

The AC filter 305 filters noise from the inverted AC power (operation S113).

The AC/AC converter 307 performs conversion on the magnitude of voltage of the filtered AC power to supply power to the grid 309 or load 317 (operation S115).

The photovoltaic device 300 supplies the converted power to the grid 309 or load 317 (operation S117).

An operation of the data logger 330 will be described in detail with reference to FIGS. 3 and 4.

Figure 3:
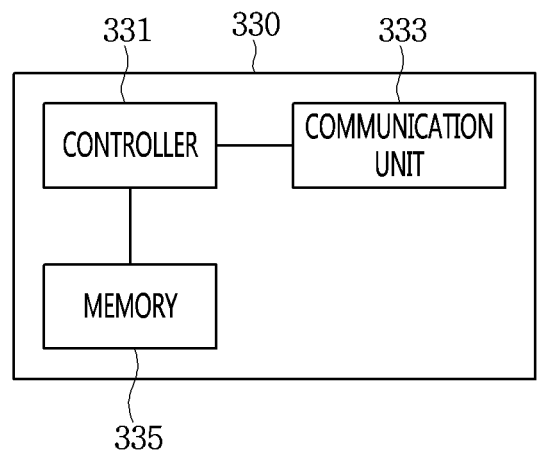
FIG. 3 is a block diagram of a data logger connected to a photovoltaic device according to another embodiment.

FIG. 3 is a block diagram of a data logger connected to a photovoltaic device according to another embodiment.

The data logger 330 includes a controller 331, a communication unit 333, and a memory 335.

The controller 331 controls an operation of the data logger 330.

The communication unit 333 receives, from the sensing unit 319, state information representing at least any one of a state of the photovoltaic device 300 and a surrounding environment state of the photovoltaic device 300. In addition, the communication unit 333 transmits the state information on the photovoltaic device 300 to the management server 350.

The memory 335 stores information necessary for operation of the data logger 330.

Figure 4:
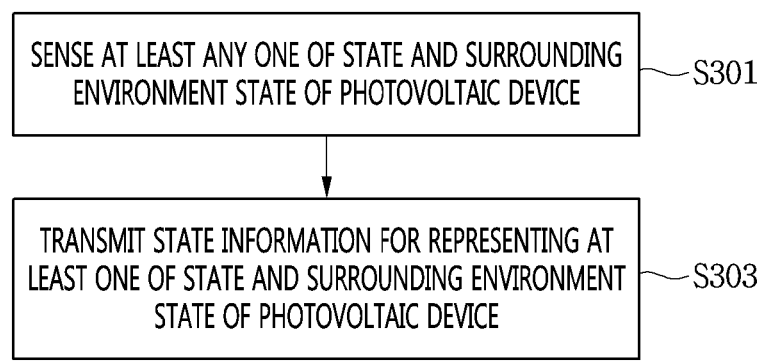
FIG. 4 is an operation flowchart of a photovoltaic device according to another embodiment.

FIG. 4 is an operation flowchart of a photovoltaic device according to another embodiment.

The sensing unit 319 senses at least any one of a state of the photovoltaic device 300 and a surrounding environment state of the photovoltaic device 300 (operation S301). As described above, the sensing unit 319 may sense at least any one of a voltage of power generated by the photovoltaic device 300, solar insolation on and a temperature of a place where the photovoltaic device 300 is located, and a temperature in the photovoltaic device 300.

The sensing unit 319 transmits state information representing at least any one of a state of the photovoltaic device 300 and a surrounding environment state of the photovoltaic device 300 (operation S303). In detail, the sensing unit 319 may transmit, to the data logger 330, the state information representing at least any one of a state of the photovoltaic device 300 and a surrounding environment state of the photovoltaic device 300.

Figure 5A:
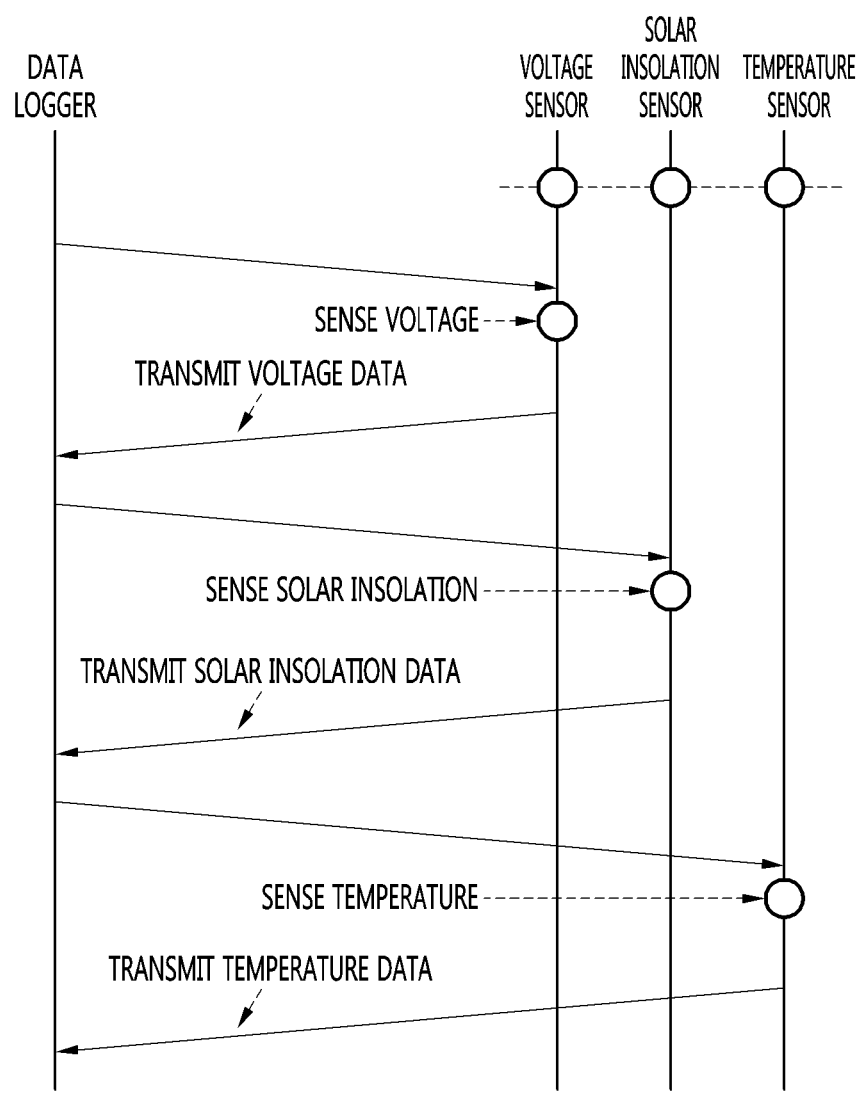
FIGS. 5A and 5B illustrate that a sensing unit detects at least any one of a state of a photovoltaic device and environmental information around the photovoltaic device, and transmits, to a data logger, state information representing at least any one of the state of the photovoltaic device and environmental information around the photovoltaic device according to another embodiment.
Figures 5B, 6:
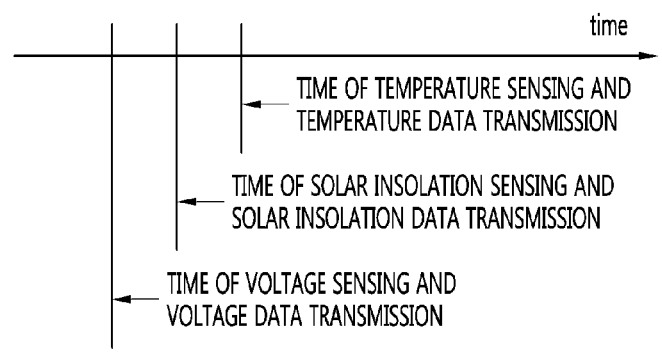
FIG. 6 shows a syntax of state information for a photovoltaic device according to another embodiment.

FIGS. 5A and 5B illustrate that a sensing unit detects at least any one of a state of a photovoltaic device and environmental information around the photovoltaic device, and transmits, to a data logger, state information representing at least any one of the state of the photovoltaic device and environmental information around the photovoltaic device according to another embodiment.

FIG. 5A illustrates information transmission between the sensing unit 319 and the data logger 330. FIG. 5B illustrates that each sensor of the sensing unit 319 sequentially sense at least any one of the state of the photovoltaic device 300 and environmental information around the photovoltaic device 300. In embodiments illustrated in FIGS. 5A and 5B, the sensing unit 319 includes a voltage sensor, solar insolation sensor, and temperature sensor. As illustrated in FIGS. 5A and 5B, when the plurality of sensors sequentially sense at least any one of the state of the photovoltaic device 300 and environmental information around the photovoltaic device 300 and sequentially transmit state information representing the sensed information, there exist time differences between state informations representing different states. Accordingly, it is difficult to use the state information in performance analysis and analysis of causes of failures of the photovoltaic device 300. For example, it is difficult to use the state information in a maximum power point tracking (MPPT) algorithm for analyzing a function of a solar light inverter.

In addition, it is also difficult to determine the state information by considering a time when the data logger 330 or the management server 350 is sensed, since information transmitted by the sensing unit 319 does not include the time when the state information is sensed. An operation of the sensing unit 319 or the data logger 330 for addressing these limitations will be described with reference to FIGS. 6 to 8.

FIG. 6 shows a syntax of state information for a photovoltaic device according to another embodiment.

The state information representing at least any one of the state of the photovoltaic device 300 and the environmental information around the photovoltaic device 300 may include at least any one of identification information for identifying a sensor, measurement information for representing a value sensed by the sensor, time information for representing a sensing time, and error detection information for detecting an information error. In detail, the identification information for identifying a sensor may include at least any one of sensor address information for representing a connection position of the sensor and sensor type information for representing a sensor type. In addition, in a detailed embodiment, the error detection information may be cyclic redundancy check (CRC) information. In the embodiment illustrated in FIG. 6, a state information packet of the sensing unit 319 includes a field for representing the sensor address information, a field for representing the sensor type information, a field for representing the measurement information, a field for representing the time information, and a field for representing the error detection information. When the state information includes the time information for representing the time when the sensor senses, the management server 350 may precisely and efficiently manage the photovoltaic device 300 on the basis of the time information included in the state information.

In a detailed embodiment, the sensing unit 319 may insert, into the state information, at least any one of the identification information for identifying the sensor, the measurement information for representing a value sensed by the sensor, the time information for representing the sensing time, and the error detection information for detecting the information error, and may transmit the state information to the data logger 330.

In a detailed embodiment, when sensing information and immediately transmitting the information, the sensing unit 319 may transmit the state information without inserting the time information and the data logger 330 may insert the time information to the state information transmitted by the sensing unit 319. Furthermore, in a detailed embodiment, the sensing unit 319 may transmit only the measurement information and the data logger 330 may insert informations other than the measurement information included in the state information. In detail, the sensing unit 319 may transmit the state information including only the measurement information, and the data logger 330 may insert, into the state information, at least any one of the time information for representing the sensing time and the error detection information for detecting the information error to transmit the state information to the management server 450. In this case, a configuration of the sensing unit 319 may be simplified because the sensing unit 319 senses at least any one of the state of the photovoltaic device 300 and the environmental information around the photovoltaic device 300, and simply transmits the sensed result.

Figure 7A:
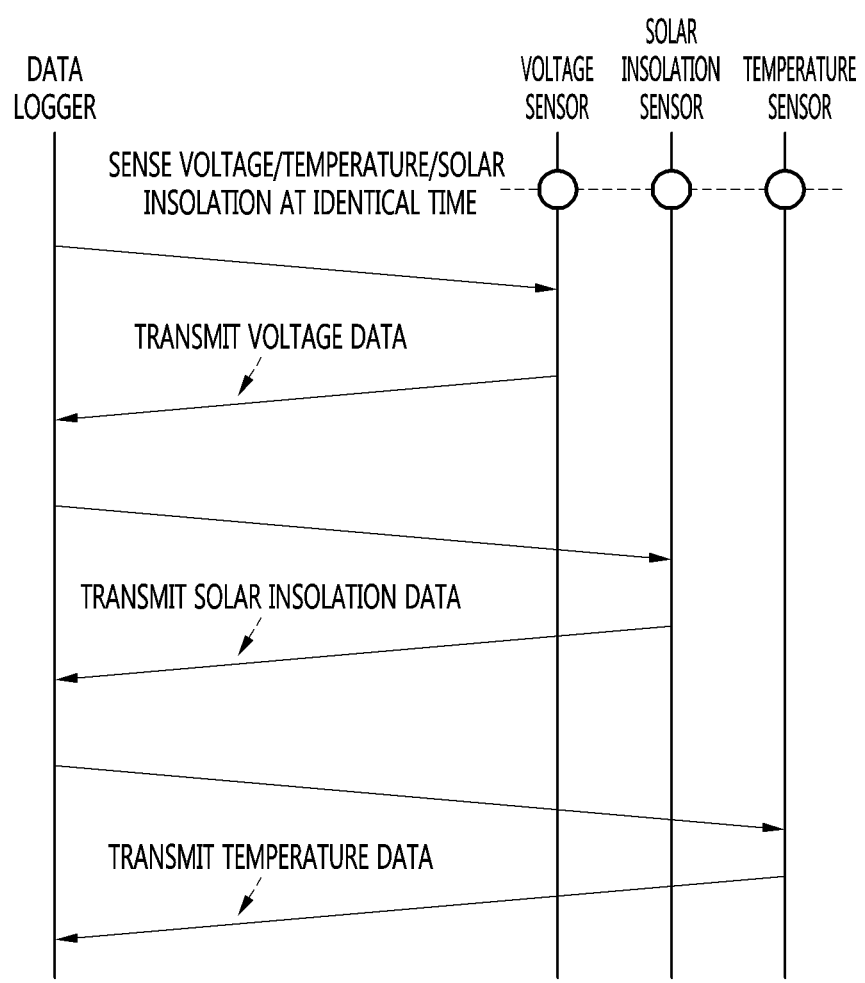
FIGS. 7A and 7B illustrate that a sensing unit detects at least any one of a state of a photovoltaic device and environmental information around the photovoltaic device, and transmits, to a data logger, state information representing at least any one of the state of the photovoltaic device and environmental information around the photovoltaic device according to another embodiment.
Figure 7B:
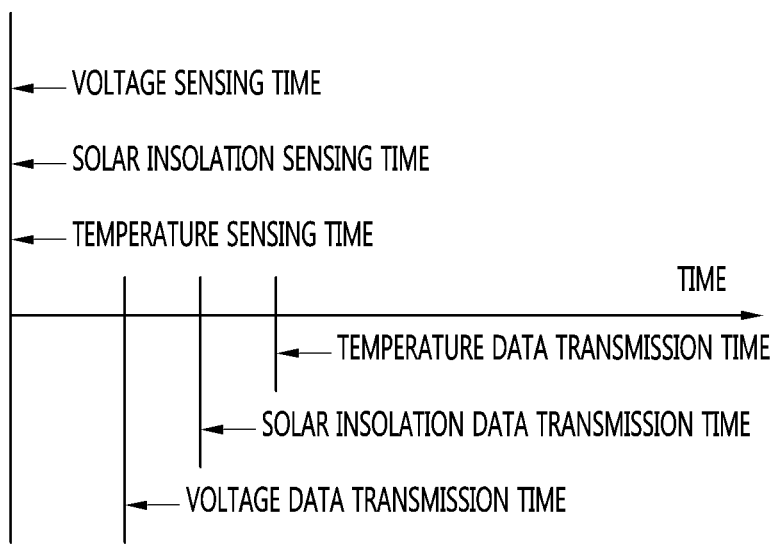

FIGS. 7A and 7B illustrate that a sensing unit detects at least any one of a state of a photovoltaic device and environmental information around the photovoltaic device, and transmits, to a data logger, state information representing at least any one of the state of the photovoltaic device and environmental information around the photovoltaic device according to another embodiment.

FIG. 7A illustrates information transmission between the sensing unit 319 and the data logger 330. FIG. 7B illustrates that the sensors of the sensing unit 319 simultaneously sense at least any one of the state of the photovoltaic device 300 and environmental information around the photovoltaic device 300. In embodiments of FIGS. 7A and 7B, the sensing unit 319 includes the voltage sensor, solar insolation sensor, and temperature sensor. As illustrated in FIGS. 7A and 7B, when the plurality of sensors included in the sensing unit 319 simultaneously sense at least any one of the state of the photovoltaic device 300 and the environmental information around the photovoltaic device 300, the state information may be obtained more consistently than the case of being sequentially sensed. In addition, when being unable to simultaneously transmit, to the data logger 330, the at least any one of the sensed state of the photovoltaic device 300 or the sensed environmental information around the photovoltaic device 300 due to a communication traffic control or the like, the sensing unit 319 may sequentially transmit it to the data logger 330.

Figure 8:
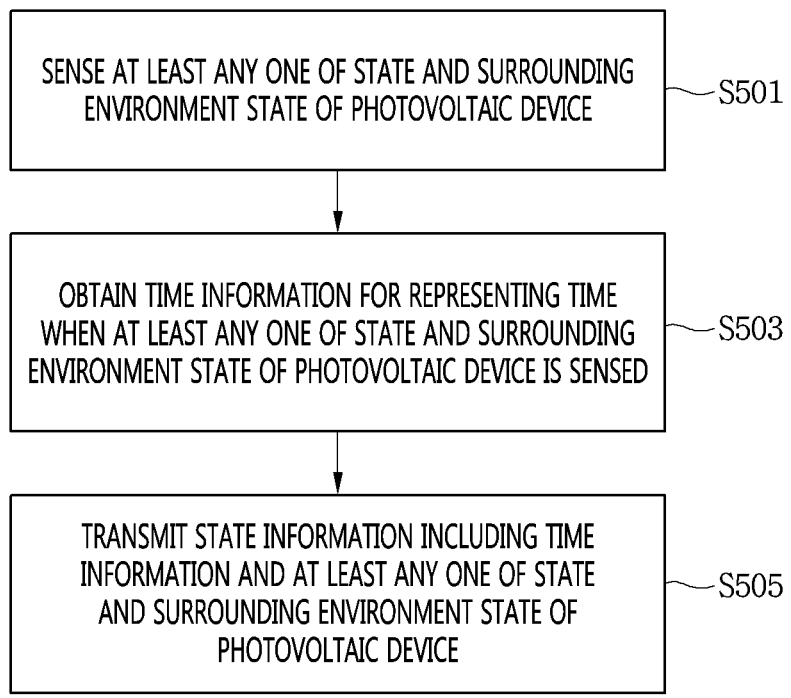
FIG. 8 is an operation flowchart of a sensing unit of a photovoltaic device according to another embodiment.

FIG. 8 is an operation flowchart of a sensing unit of a photovoltaic device according to another embodiment.

The sensing unit 319 senses at least any one of the state of the photovoltaic device 300 and the surrounding environment state of the photovoltaic device 300 (operation S501). As described above, the sensing unit 319 may sense at least any one of a voltage of the power generated by the photovoltaic device 300, a solar insolation and temperature of a place where the photovoltaic device 300 is located, and a temperature in the photovoltaic device 300.

The sensing unit 319 obtains time information for representing a time when at least any one of the state of the photovoltaic device 300 and the surrounding environment state of the photovoltaic device 300 is sensed (operation S503).

The sensing unit 319 transmits state information representing the time information and at least any one of the state of the photovoltaic device 300 and the surrounding environment state of the photovoltaic device 300 (operation S505). In detail, the sensing unit 319 may transmit, to the data logger 330, the state information representing at least any one of the state of the photovoltaic device 300 and the surrounding environment state of the photovoltaic device 300. At this point, the state information may have the same format as that explained in relation to FIG. 6. In addition, as described above, the sensing unit 319 may sense the at least any one of the state of the photovoltaic device 300 and the surrounding environment state of the photovoltaic device 300, and may transmit state information including only the sensed information. The data logger 330 may insert time information into the state information and then transmit the state information to the management server 450.

Through this operation, the photovoltaic device 300 may be efficiently managed by obtaining the state of the photovoltaic device 300 and precise information on the surrounding environment thereof.

According to embodiments, a photovoltaic device can be efficiently and precisely managed by providing the photovoltaic device for efficiently and accurately recording and transmitting a state thereof. In particular, the embodiments allow the time when the state of the photovoltaic device is recorded to be known by recording a state of the photovoltaic device and a time when the state of the photovoltaic device is detected and transmitting them together. In addition, a plurality of sensing units record the state of the photovoltaic device at the same time and allow that a plurality of states of the photovoltaic device are precisely analyzed.

In the foregoing, features, structures, or effects described in connection with embodiments are included in at least one embodiment, and are not necessarily limited to one embodiment. Furthermore, the exemplified features, structures, or effects in various embodiments can be combined and modified by those skilled in the art. Accordingly, contents in connection with these combination and modification should be construed to fall in the scope of the present invention.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A photovoltaic device comprising:
   a photovoltaic cell array configured to absorb solar voltaic energy to convert the solar voltaic energy to electrical energy; and
   a sensing unit configured to sense at least any one of power generation information including a voltage of power generated by the photovoltaic device and a temperature in the photovoltaic device and environmental information including a solar insolation and temperature of a place where the photovoltaic device is located, and measure a time when at least any one of the voltage of power generated by the photovoltaic device, the temperature in the photovoltaic device, the solar insolation and the temperature of the place where the photovoltaic device is located is sensed, wherein the sensing unit comprises a plurality of sensors, the plurality of sensors sense the at least any one of the power generation information and the environmental information at an identical time, wherein the sensing unit is further configured to transmit, sequentially, the at least any one of the power generation information and the environmental information when being unable to simultaneously transmit, to a data logger, the at least any one of the power generation information and the environmental information.

2. The photovoltaic device according to claim 1, wherein the sensing unit transmits state information comprising the at least any one of the power generation information and the environmental information, and the time when at least any one of the voltage of power generated by the photovoltaic device, the temperature in the photovoltaic device, the solar insolation and the temperature of the place where the photovoltaic device is located is sensed.

3. The photovoltaic device according to claim 2, wherein the state information comprises at least any one of identification information for identifying a sensor comprised in the sensing unit, measurement information for representing a value sensed by the sensor, time information for representing a time when the sensor senses, and error detecting information for detecting an information error.

4. The photovoltaic device according to claim 3, wherein the identification information comprises at least any one of sensor address information for representing a connection position of the sensor, and sensor type information for representing a type of the sensor.

5. An operation method of a photovoltaic device, the operation method comprising:
    absorbing solar voltaic energy to convert the solar voltaic energy to electrical energy;
    sensing, by a sensing unit, at least any one of power generation information including a voltage of power generated by the photovoltaic device and a temperature in the photovoltaic device and environmental information including a solar insolation and temperature of a place where the photovoltaic device is located; and
    measuring a time when at least any one of the voltage of power generated by the photovoltaic device, the temperature in the photovoltaic device, the solar insolation and the temperature of the place where the photovoltaic device is located,
    sensing, by a sensing unit comprising a plurality of sensors, the at least any one of the power generation information and the environmental information at an identical time, and
    transmitting, sequentially, the at least any one of power generation information and the environmental information, when being unable to simultaneously transmit, to a data logger, the at least any one of power generation information and the environmental information.

6. The operation method according to claim 5, further comprising:
    transmitting state information comprising the at least any one of the power generation information and the environmental information, and the time when at least any one of the voltage of power generated by the photovoltaic device, the temperature in the photovoltaic device, the solar insolation and the temperature of the place where the photovoltaic device is located is sensed.

7. The operation method according to claim 6, wherein the state information comprises at least any one of identification information for identifying a sensor comprised in the sensing unit, measurement information for representing a value sensed by the sensor, time information for representing a time when the sensor senses, and error detecting information for detecting an error in information.

8. The operation method according to claim 7, wherein the identification information comprises at least any one of sensor address information for representing a connection position of the sensor, and sensor type information for representing a type of the sensor.

* * * * *